(12) United States Patent
Dawson et al.

(10) Patent No.: US 8,627,291 B2
(45) Date of Patent: Jan. 7, 2014

(54) IDENTIFICATION OF LOCALIZABLE FUNCTION CALLS

(75) Inventors: Michael H. Dawson, Ottawa (CA);
Yuqing Gao, Mount Kisco, NY (US);
Megumi Ito, Kanagawa-ken (JP);
Graeme Johnson, Ottawa (CA);
Seetharami R. Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 13/437,506

(22) Filed: Apr. 2, 2012

(65) Prior Publication Data

US 2013/0263097 A1 Oct. 3, 2013

(51) Int. Cl.
*G06F 9/44* (2006.01)

(52) U.S. Cl.
USPC ........... 717/125; 707/793; 707/805; 709/203; 713/100; 716/103; 717/128

(58) Field of Classification Search
None
See application file for complete search history.

(56) References Cited

U.S. PATENT DOCUMENTS

| | | | | |
|---|---|---|---|---|
| 7,290,245 | B2 * | 10/2007 | Skjolsvold | 717/125 |
| 7,627,858 | B2 * | 12/2009 | Rose et al. | 717/125 |
| 7,634,537 | B2 * | 12/2009 | Lu | 709/203 |
| 8,307,008 | B2 * | 11/2012 | Pinkerton et al. | 707/793 |
| 2009/0240935 | A1 * | 9/2009 | Shukla | 713/100 |
| 2009/0271172 | A1 | 10/2009 | Mejdrich et al. | |
| 2010/0115494 | A1 * | 5/2010 | Gorton, Jr. | 717/128 |
| 2010/0257233 | A1 | 10/2010 | Auvray et al. | |
| 2010/0287214 | A1 * | 11/2010 | Narasayya et al. | 707/805 |
| 2011/0093836 | A1 | 4/2011 | Galicia et al. | |
| 2011/0265050 | A1 * | 10/2011 | Srinivasan et al. | 716/103 |
| 2011/0289481 | A1 * | 11/2011 | Franklin et al. | 717/125 |

FOREIGN PATENT DOCUMENTS

EP 2107460 10/2009

OTHER PUBLICATIONS

Degui Xiao, "Hybrid Model Predictive Control Based on Modified Particle Swarm Optimization", 2010, Hunan University, China, pp. 385-390, <http://ieeexplore.ieee.org/stamp/stamp.jsp?tp=&arnumber=5645289>.*
Lei Zhao, "Implementing Atomic Section by Using Hybrid Concurrent Control", 2007, University of Science & Technology of China, pp. 642-647, <http://ieeexplore.ieee.org/stamp/stamp.jsp?tp=&arnumber=4351558>.*
Chi Cao Minh, "STAMP: Stanford Transactional Applications for Multi-Processing", 2008, Computer Systems Laboratory, Stanford University, pp. 35-46, <http://ieeexplore.ieee.org/stamp/stamp.jsp?tp=&arnumber=4636089>.*
Cheng-Lung Huang, "A distributed PSO—SVM hybrid system with feature selection and parameter optimization", 2007, Huafan University, Taipei, Taiwan, pp. 1381-1391, <http://ac.els-cdn.com/S1568494607001299/1-s2.0-S1568494607001299-main.pdf?>.*

* cited by examiner

*Primary Examiner* — Thuy Dao
*Assistant Examiner* — Khanh Dang
(74) *Attorney, Agent, or Firm* — Scully, Scott, Murphy & Presser, P.C.; Louis J. Percello, Esq.

(57) ABSTRACT

Detecting localizable native methods may include statically analyzing a native binary file of a native method. For each function call invoked in the native binary, it is checked whether resources accessed through the function call is locally available or not. If all resources accessed though the native method is locally available, the method is annotated as localizable.

8 Claims, 6 Drawing Sheets

IDENTIFICATION OF LOCALIZABLE FUNCTION CALLS

FIELD

The present application relates generally to computers, and computer applications, computer systems with heterogeneous platforms and more particularly to identifying localizable function calls in computer systems.

BACKGROUND

Java® Virtual Machine (JVM) implementations support the Java® Native Interface (JNI) as a mechanism which allows Java® code to call methods written in C and C++ (native code) and vice versa. Traditionally both the code written in Java™ and the native code is executed in the same process and by the same thread as execution transitions between the two.

It is possible, however, to construct a JVM such that the native code is run in one or more Remote Execution Containers which may be hosted in separate processes on the same or different machines from where the Java® code is executed such that the native code is unaware that it is executing separately from the JVM. This separation prevents misbehaved native code from destabilizing the JVM and enables running the native code in a different environment (e.g., security context, bit width) than the main JVM.

In a split JVM the cost of the calls between Java® and native code have much greater overhead and latency resulting in the need to reduce round-trips where possible. With the standardized Java Native Interface (JNI) an application often has to make multiple calls to get the information needed to complete an action.

In a traditional JVM the overhead for a JNI to Java call is low enough to be acceptable. In the case of a distributed JVM, however, the latency of making a cross-process/cross-machine call may be magnitudes of order greater than required to run the method called. Because the Java Native Interface is standardized and all existing code needs to run in the Distributed JVM without modification, the option of changing the API to allow the application to request the data in a more efficient manner is not available. Therefore, the present disclosure recognizes that the number of round trips should be reduced to the minimum possible in a way that is transparent to the existing applications.

The distributed JVM concept is relevant in hybrid systems. Hybrid system in the present disclosure refers to a heterogeneous distributed system that contains both general and special-purpose computing platforms. One example is the zEnterprise system, which has system Z, X86 and Power7 blades, from International Business Machines Corporation (IBM®), Armonk, N.Y. Since hybrid systems could serve as a flexible platform for optimizing workload in terms of performance, more and more applications could benefit from running in hybrid systems.

JVM Proxy can accelerate Java® applications on hybrid systems by running a proxy JVM on a separate accelerator, which makes all Java® methods run on the accelerator and native methods run on the main machine. To improve application performance on JVM proxy, the present disclosure recognizes that native methods should be localized to run on accelerator, because a remote native method call initiated from a Java® method running on accelerator requires additional network round-trip overhead compared to the single system case. However, not all native methods can be localized. Checking if a native method can be localized by reading the source code manually requires much human cost. If a native method created newly or modified, such check needs to be made again.

BRIEF SUMMARY

A method for detecting localizable native methods, in one aspect, may include analyzing a binary file of a native method to identify one or more function calls invoked within the binary file. The method may also include, for each of the identified one or more function calls, determining whether the function call accesses a resource locally unavailable on a selected machine. The method may further include, if it is determined that none of the one or more function calls access a resource locally unavailable on the selected machine, annotating the native method as localizable. The method may also include, if it is determined that at least one of the one or more function calls accesses a resource locally unavailable on the selected machine, annotating the native method as not localizable.

A system for detecting localizable native methods, in one aspect, may include an analytic module operable to analyze a binary file of a native method to identify one or more function calls invoked within the binary file. The analytic module may be further operable to, for each of the identified one or more function calls, determine automatically, whether the function call accesses a resource locally unavailable on a selected machine, and if it is determined that none of the one or more function calls access a resource locally unavailable on the selected machine, annotate the native method as localizable, and if it is determined that at least one of the one or more function calls accesses a resource locally unavailable on the selected machine, annotate the native method as not localizable.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
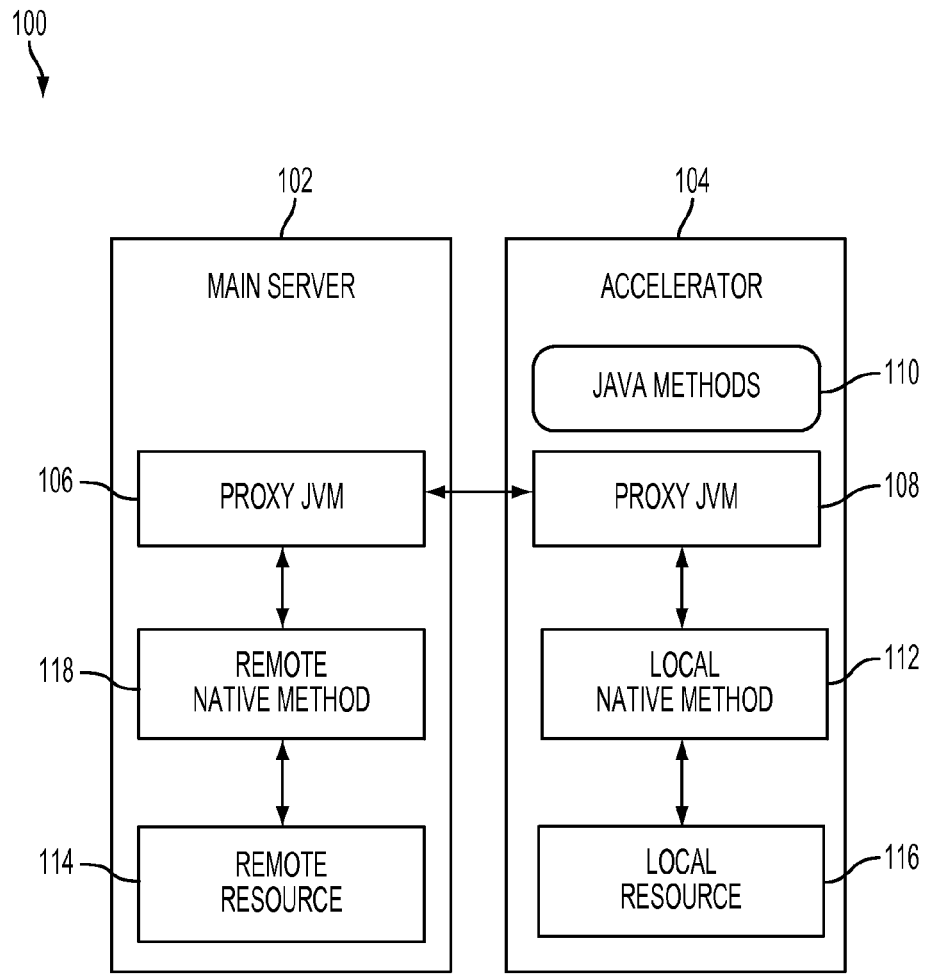
FIG. 1 shows an example of a main processor and a separate accelerator of a hybrid system in one embodiment of the present disclosure.

Methodologies for identifying localizable function or method calls are disclosed. FIG. 1 shows an example of a main server 102 and a separate accelerator (a processing core)

104 of a hybrid system 100. A proxy 106, such as JVM Proxy, can accelerate applications, e.g., Java® applications, on the hybrid system 100 by running a proxy JVM 108 on the separate accelerator 104. For example, proxy JVM 106 on the main server 102 may intercept application calls and sends the calls to the accelerator 104, for proxy JVM 108 to run the application calls 110. In one embodiment of the present disclosure, a methodology automatically identifies which applications calls can be localized at the accelerator 104, for example, so that the proxy JVM 106 on the main server 102 can send those applications calls to the proxy JVM 108. Those application calls (local native method 112) that do not use remote resources (e.g., 114) or only uses local resources (116) can be identified as being localizable on the accelerator in one embodiment of the present disclosure. Native methods 118 that access resources outside the accelerator may be left to run on the main server 102 or another processor. While FIG. 1 shows JVM and Java® methods, it should be understood that the embodiments of the present disclosure may apply to any other hybrid systems.

To ensure that all native resources a native method accesses should be available on the accelerator, a methodology of the present disclosure in one embodiment automatically and statically checks the localizability of native methods.

Native methods refer to computer code that is machine dependent once the code is compiled, e.g., depends on the fixed characteristics of the machine for which the codes is compiled. Native methods are usually compiled in platform-specific compiler, e.g., C or C++, or other computer programming language compilers. Native resources refer to hardware and/or processing components attached to a particular machine, e.g., network cards, memory resources, encryption/decryption functionality of the machine or processor, data stored locally, and/or others.

In one embodiment of the present disclosure, library calls such as glibc calls in a native method may be detected and the local availability of resources they access is determined. For instance, accesses to resources by native method may be determined statically by analyzing a compiled code, e.g., local ".so" binary files, and creating a call graph for a native method. If there is no standard library call within the native method and within all its callee functions, the native method is marked as localizable. In the native methods not marked localizable in the previous step, if there is a native method which calls one or more standard library calls within the method or its callee functions, and all native resources accessed by them are locally available on the local platform (e.g., an accelerator), the native method is marked as localizable. For native methods not marked localizable in the previous steps, mark them as no-localizable. Statically analyzing the compiled code may be performed off-line, e.g., without having to run the code.

Figure 2:
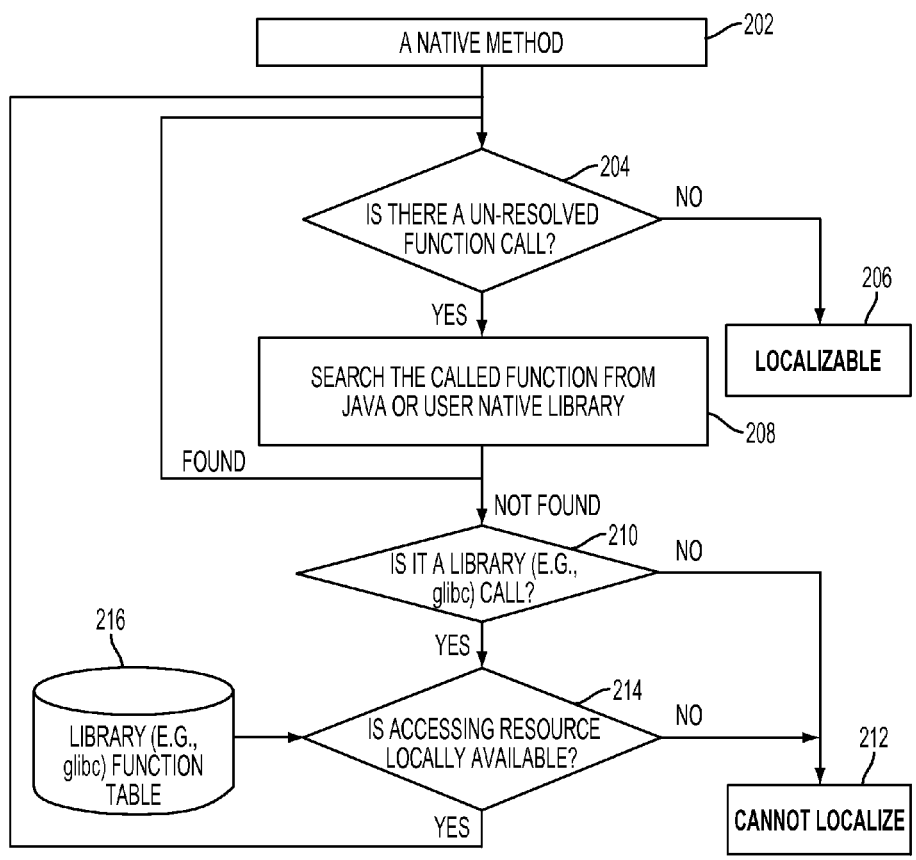
FIG. 2 is a flow diagram illustrating a method of determining whether a function is localizable in one embodiment of the present disclosure.

FIG. 2 is a flow diagram illustrating a method of determining whether a function is localizable, for instance, to ensure all native resources a native method uses are locally available. Generally, methods or functions access native resources via standard library functions. Referring to FIG. 2, at 202, the compiled code, e.g., binary files, is analyzed and a call graph for every native method may be created. A call graph lays out a sequence of functions or methods the native method calls, and functions or methods those functions and methods in turn may call, and so on; a node in a call graph represents a function call. Traversing a call graph created for a native method, at 204, it is determined whether there is an un-resolved function call, e.g., a library call or another function call. If there are no un-resolved function calls, at 206, the native method is determined to be localizable. If there are function calls to further analyze in the native method (e.g., determined via the call graph), the called function is searched from a program compiler library or user native library at 208. For instance, the logic of the present disclosure in one embodiment may first search JVM and user library. If the sequence of function calls of a native method stays in the library, it means the native method does not require external resources, so the logic of the present disclosure in one embodiment can determine that the native method is localizable. If the function is found in the program compiler or user native library, the logic continues to 204. Otherwise at 210, it is determined whether the function call is a standard library call. If not, at 212, the native method is determined to be not localizable, e.g., because the function call is not found locally. If at 210, it is determined that the function call is a standard library call, the logic continues to 214. At 214, it is determined whether the function which is a standard library call is accessing a resource that is available locally. This may be done by looking up a database table or the like of the library calls 216. The table 216 for instance may include information as to which resources the library calls are accessing. If the function is accessing a resource that is available locally, the logic continues to 204, where another call graph node is checked. Otherwise, the native method is determined to be not localizable at 212.

An embodiment of the present disclosure presents a library function table 216 (an example shown below for glibc standard library), which contains standard library function information on native resources and local availability. Such library function table 216 may be utilized to check native resources accessed by a standard library function and its local availability. An example below shows such a table for glibc standard library. However, the present disclosure does not limit the table to only glibc standard library. If there is a system call directly invoked from a native method or its callee functions without calling a standard library function, an embodiment of the present disclosure may use a system call table, which contains its accessing resources and local availability, similar to the standard library function table.

TABLE 1 glibc function table.

| <Function Name> | <Native Resource> | <Local Availability> |
|---|---|---|
| Func1 | Socket | Locally available |
| Func2 | File | Not available |
| Func3 | None | |
| ... | | |

Figure 3:
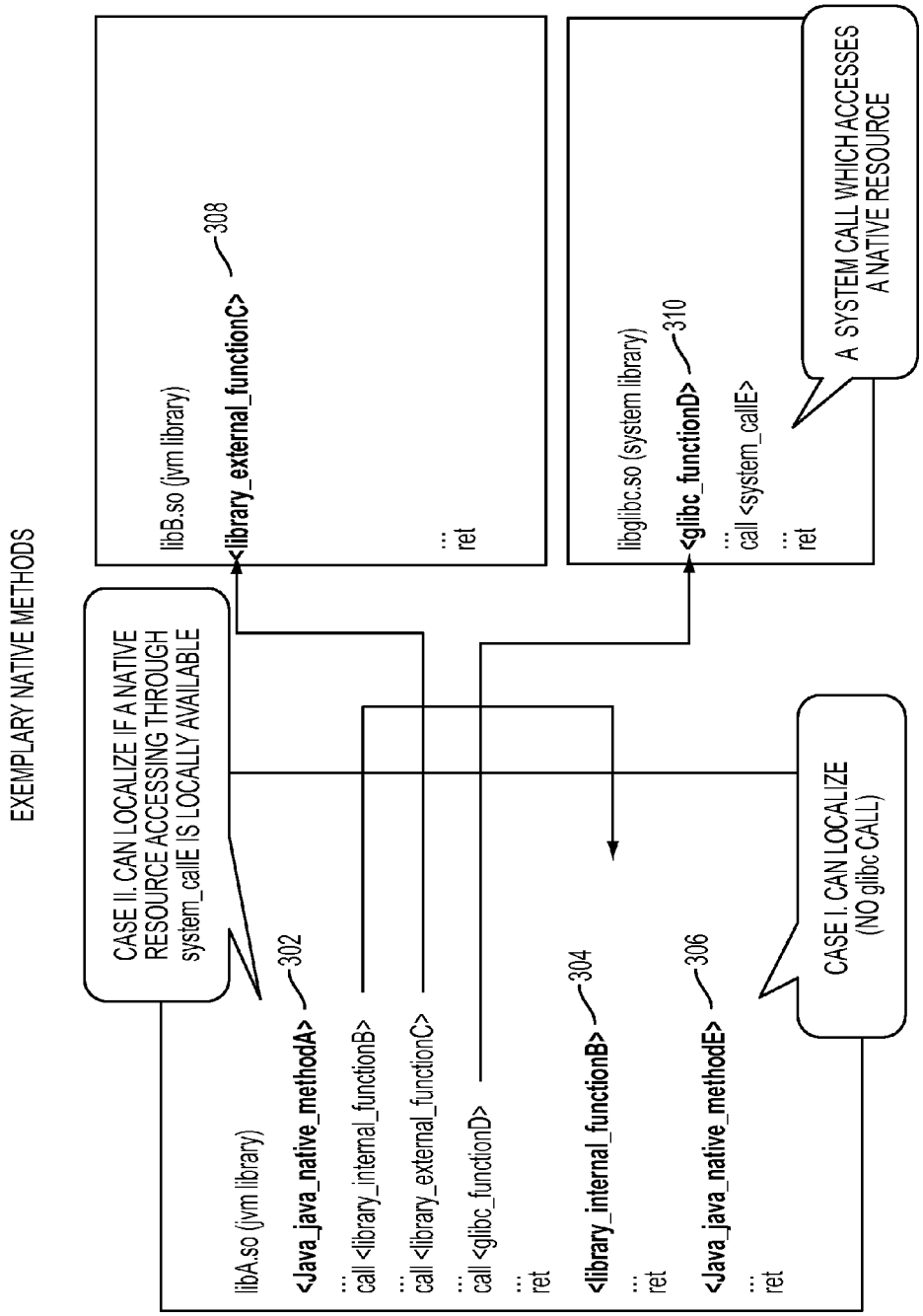
FIG. 3 illustrates an example x86 native methods.
Figure 4:
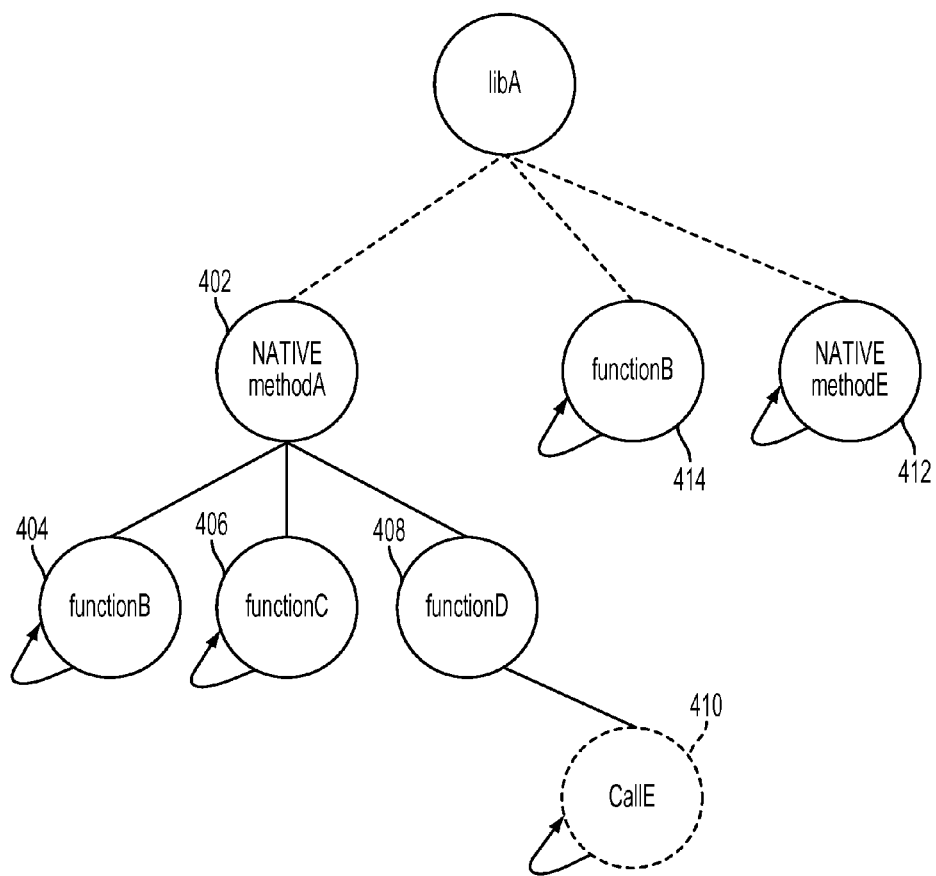
FIG. 4 illustrates an example of a call graph created for a native method in one embodiment of the present disclosure.

FIG. 3 illustrates two exemplary native methods from a typical x86 binary compiled in instruction set architecture of Intel® 8086 central processing unit (CPU). In this example, the compiled binary may include two native methods "methodA" 302, and "methodE" 306. In addition, it includes "functionB" 304 and "functionC" 308, "functionD" 310. FIG. 4 illustrates an example call graph for this example. A call graph for this example may include nodes representing "methodA" 402, "functionB" 414, and "methodE" 412. "methodA" 402 has child nodes "functionB" 404, "functionC" 406, and "functionD" 408. Further, "functionD" 408 call graph may include "callE" 410 as the child node. Native "methodE" 412 contains no child so its call graph has no children.

In this example, the methodology of the present disclosure evaluates native MethodE 306 and determines that it is localizable since there are no other function calls in this method.

With respect to "methodA" 302, that method has calls to three functions, "functionB", "functionC", and "functionD." "functionB" 304 is an internal function in this example and it has no children. "functionC" 308 is an external function in this example referring to an external library. This means "functionC" is a library external function in libB.so. Both libA.so and libB.so are JVM or user library in this example. If "methodA" does not call "functionD", "methodA" can be localized. "functionD" 310 is a standard library function in this example. The methodology of the present disclosure in one embodiment evaluates "functionB" 304 and determines that it is an internal function, which does not have any other function calls. The methodology of the present disclosure in one embodiment evaluates "functionC" 308 and determines that it is an external function so its corresponding library will be analyzed accordingly. In this case, the function is checked whether is has function calls, as in the same way as library internal functions. If functions in the same name as "functionC" exist in multiple libraries, the methodology of the present disclosure in one embodiment may find a library to check by the system link parameter or others. If the library to be checked cannot be determined, all the functions in the same name as "functionC" may be checked and determined whether they are localizable in order to determine whether "functionC" can be localized.

The methodology of the present disclosure in one embodiment evaluates "functionD" 310 and determines that it is a call to a standard library that invokes a system call "callE". A check is made then to determine whether this system call (in this example, "callE") accesses a native resource or resource that is outside the local machine (in this example, x86 CPU). If so, "methodA" 302 is determined to be localizable.

In one embodiment of the present disclosure, those methods determined not as "localizable" may be further classified as "may be localizable" or "non-localizable". If a native method is determined or classified as localizable, that method is deemed to have affinity with the local machine for which the native method was compiled to run on. Otherwise, that method is deemed to have affinity with a remote machine. A table or database of affinity may be created accordingly and this table may be updated and changed based on external circumstances such as resources being added to a local machine and/or remote machine, the native method being modified, and others.

Figure 5A:
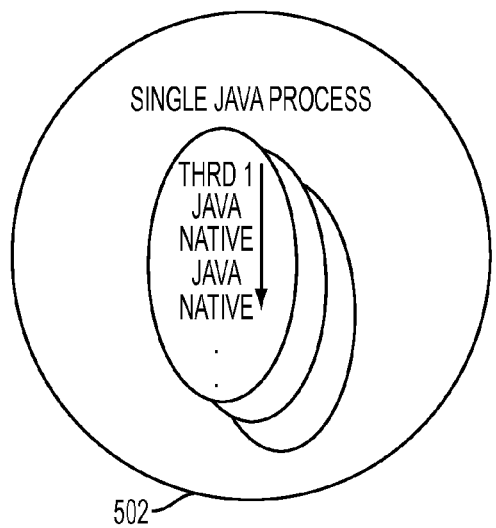
FIGS. 5A and 5B illustrate virtual machine schema in one embodiment of the present disclosure.
Figure 5B:
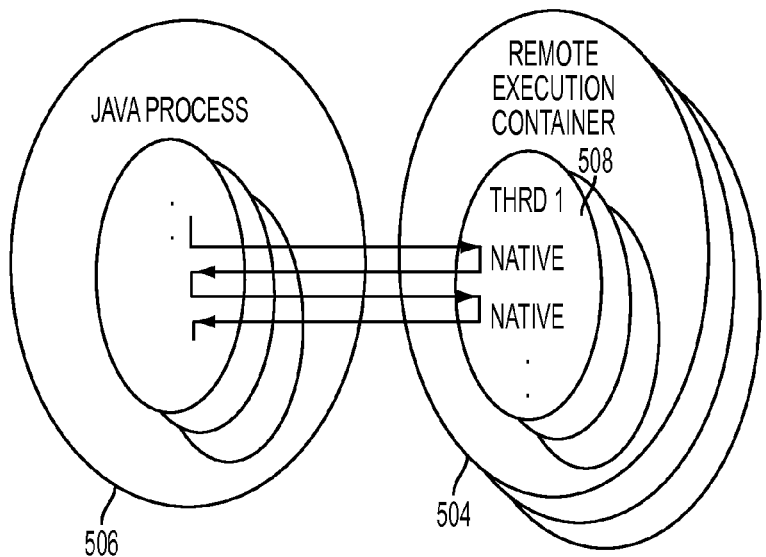

FIGS. 5A and 5B illustrate virtual machine processes and threads schema. In a traditional Java® Virtual Machine, a single Java® process may execute Java® code and native code as shown at 502. In distributed Java® Virtual Machines, a native code may run in remote execution container 504 separate from a process 506 that runs Java® code. The methodology of the present disclosure in one embodiment may identify the native methods 508 that are localizable in the remote execution container, so as to reduce the cross-machine/cross-process calls.

Figure 6:
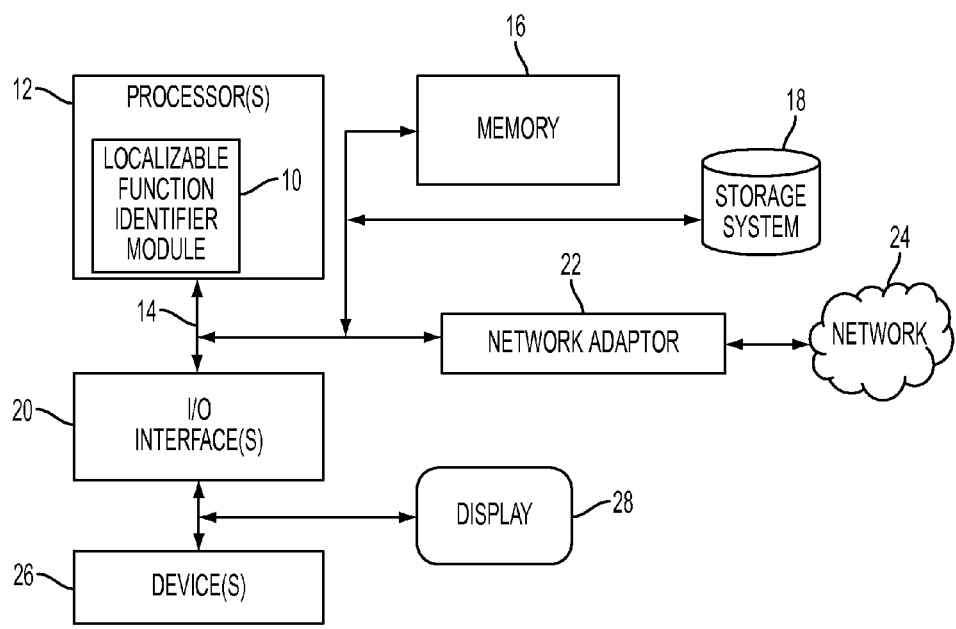
FIG. 6 illustrates a schematic of an example computer or processing system that may implement the localizable function identifier system in one embodiment of the present disclosure.

FIG. 6 illustrates a schematic of an example computer or processing system that may implement the localizable function identifier system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a localizable function identifier module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for detecting localizable native methods, comprising: analyzing, by a processor, a binary file of a native method to identify one or more function calls invoked within the binary file;

for each of the identified one or more function calls, determining, by the processor automatically, whether said function call accesses a resource locally unavailable on a selected machine;

if it is determined that none of said one or more function calls access a resource locally unavailable on the selected machine, annotating, by the processor automatically, said native method as localizable; and if it is determined that at least one of said one or more function calls accesses a resource locally unavailable on the selected machine, annotating, by the processor automatically, said native method as not localizable.

2. The method of claim 1, wherein said analyzing is performed statically.

3. The method of claim 1, further including creating a call graph associated with the native method, the call graph including nodes respectively representing said one or more function calls, and the step of determining includes traversing said call graph.

4. The method of claim 3, wherein the step of determining further includes determining whether the function call represented by a node of the call graph is a library function call, and if the function call is a library function call, looking up a library function table to determine whether the library function call accesses a resource locally unavailable on the selected machine.

5. The method of claim 3, wherein the step of determining further includes determining whether the function call represented by a node of the call graph is a system call, and if the function call is a system call, looking up a system call table to determine whether the system call accesses a resource locally unavailable on the selected machine.

6. The method of claim 1, further including annotating which function calls in said binary file is accessing a resource that is not available on the selected machine.

7. The method of claim 1, the method further including measuring affinity of said native method to the selected machine based on whether the native method is determined to be localizable.

8. The method of claim 7, further including recording said affinity measure.

* * * * *